Fig. 3 ELEVATED TEMPERATURE RUN
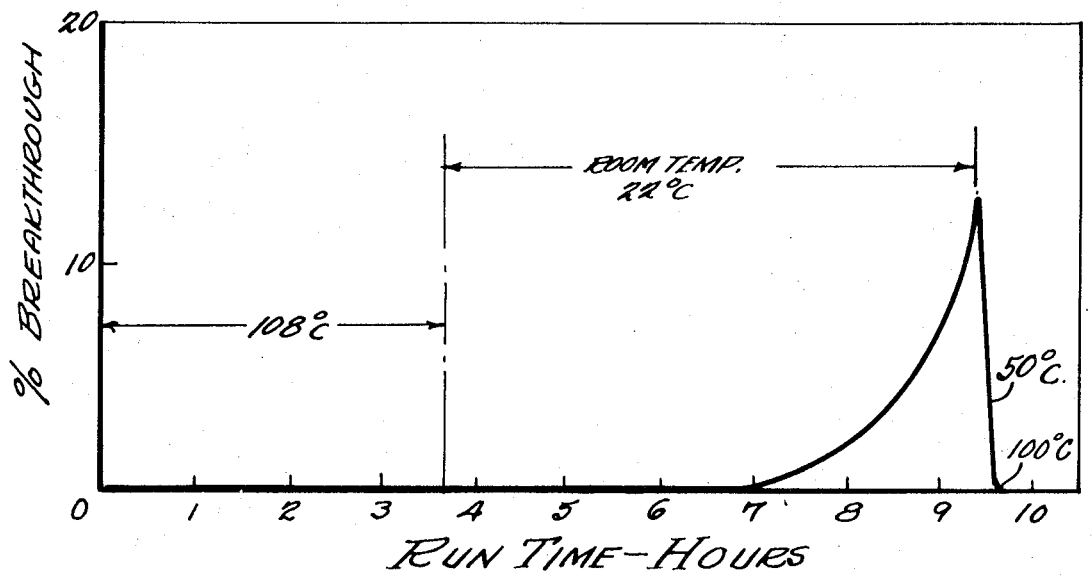
Fig. 4 ROOM TEMPERATURE RUN
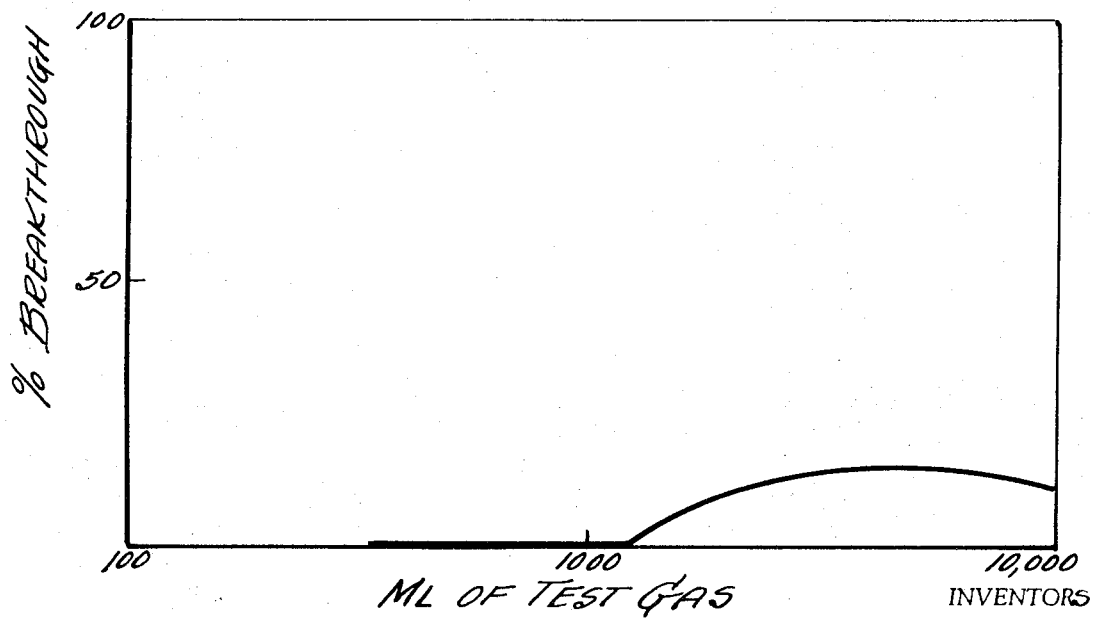

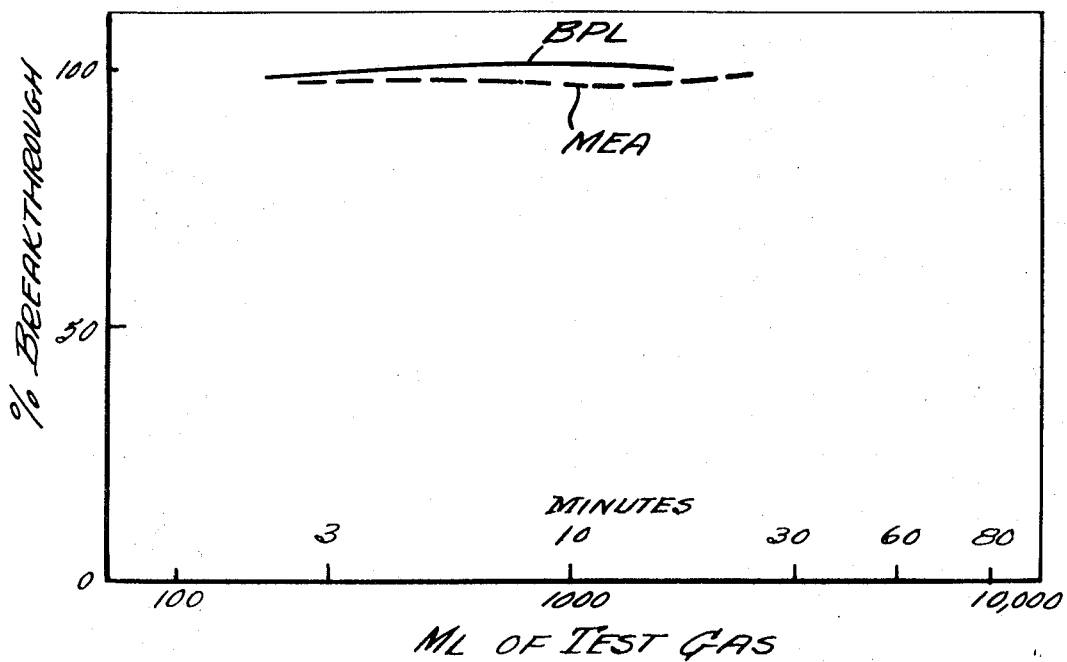
Fig. 5  Room Temperature Runs
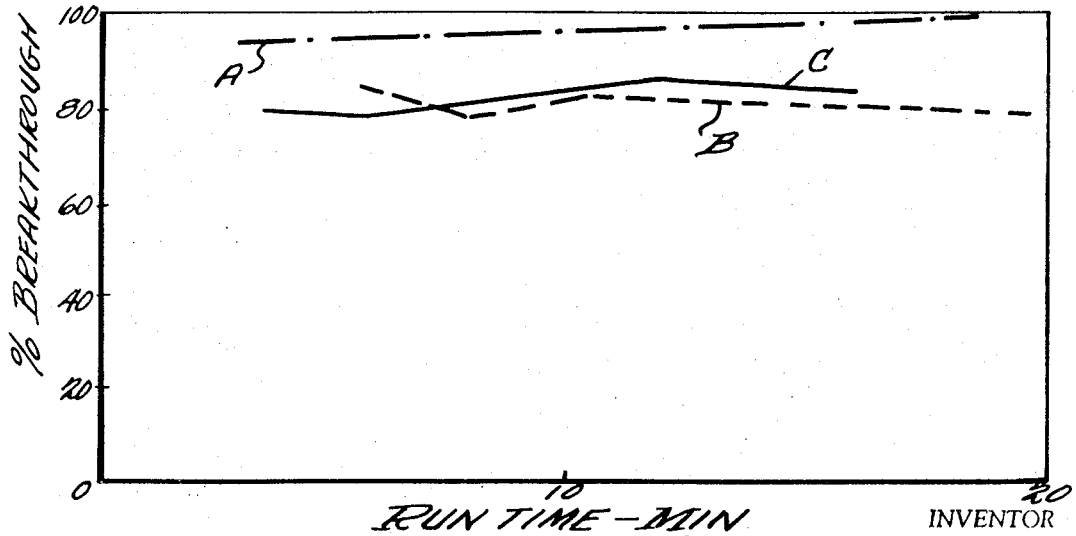
Fig. 6  Chrominum or Copper

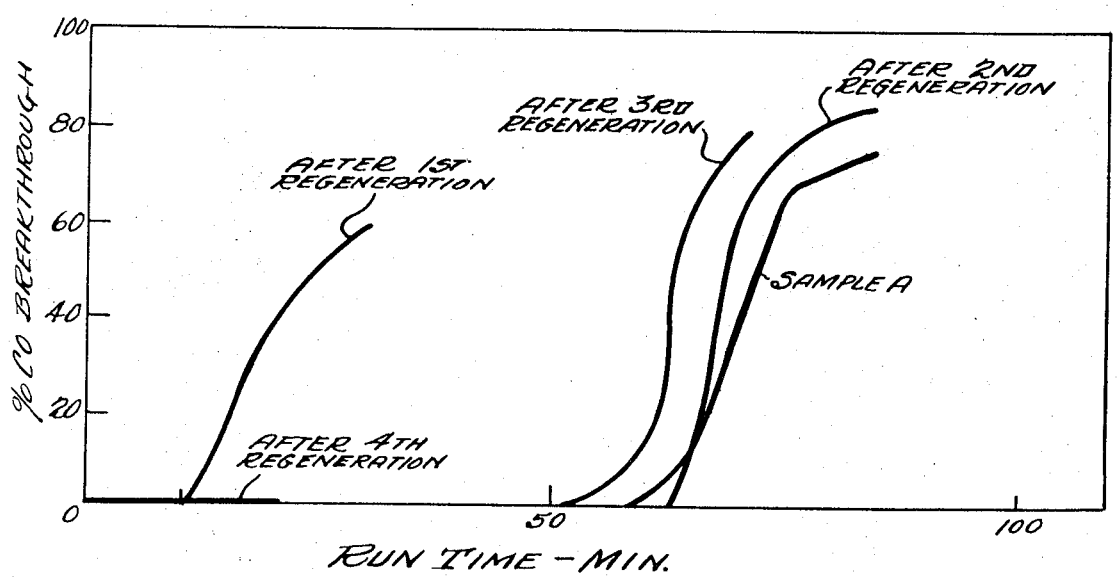
Fig. 8 — ELEVATED TEMPERATURE RUN Cu-Cr CARBON
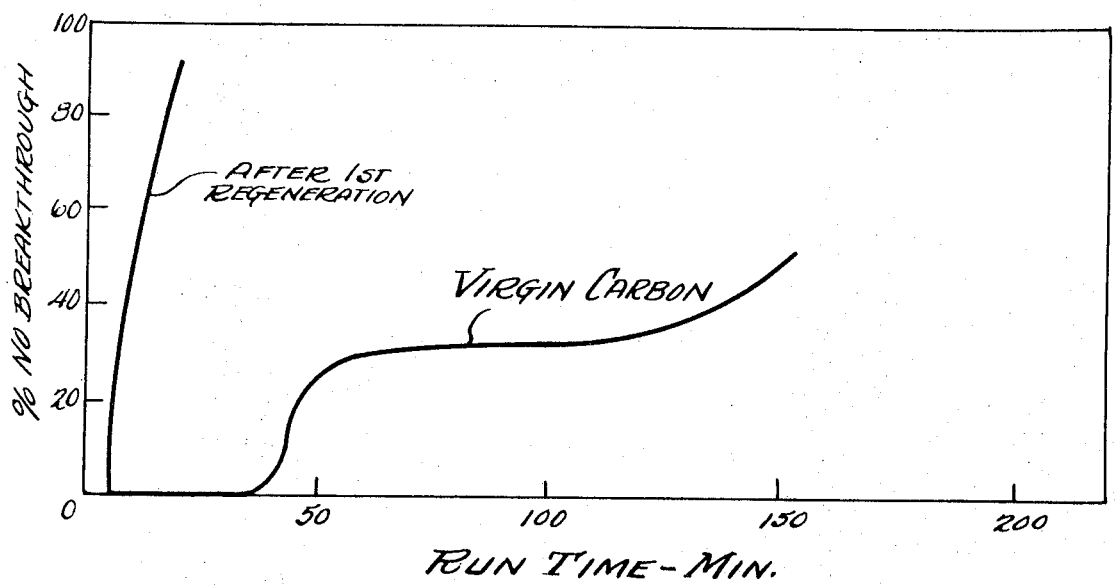
Fig. 9 — ELEVATED TEMPERATURE RUN Cu-Cr CARBON

United States Patent Office 3,576,596
Patented Apr. 27, 1971

3,576,596
REMOVAL OF CARBON MONOXIDE AND NITRIC OXIDE WITH COPPER CHROMIUM IMPREGNATED ON A SUPPORT
Marion F. Kranc, Bethel Park, and John R. Lutchko, Pittsburgh, Pa., assignors to Calgon Corporation
Continuation-in-part of abandoned application Ser. No. 653,517, July 14, 1967. This application Oct. 13, 1967, Ser. No. 683,062
Int. Cl. B01d 53/00, 53/34
U.S. Cl. 23—25                                   13 Claims

ABSTRACT OF THE DISCLOSURE

Carbon monoxide is removed from nitrogen, ammonia synthesis gas, air, automobile exhausts and other gases by a mixture of copper-chromium impregnated on a support of high surface area, preferably activated carbon. Copper-chromium-silver impregnated supports also can be used.

The impregnated supports also can be used to remove nitric oxide from other gases.

---

This application is a continuation-in-part of application Ser. No. 653,517, filed July 14, 1967, and now abandoned.

The present invention relates to the removal of carbon monoxide and nitric oxide from gases.

Carbon monoxide is frequently an undesired impurity in various gases and must be removed. Thus a carbon monoxide content of 50 p.p.m. is deleterious in ammonia synthesis reactors using a zinc-iron catalyst. It also has a poisoning effect upon nickel, copper, cobalt and other hydrogenation catalysts.

The present expensive procedures have been employed for removing carbon monoxide including methanation or cuprous ammonium sulfate solutions and these methods are only partially successful at best.

Accordingly, it is an object of the present invention to remove carbon monoxide from other gases.

Another object is to remove nitric oxide from other gases.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be obtained by passing the carbon monoxide containing gas through a copper-chromium compound impregnated on a support of high surface area. It is critical that copper and chromium compounds be employed since neither copper oxide or chromium trioxide by itself, for example, is effective. Apparently at least a portion of the copper compound (e.g. cupric oxide) reacts with the chromic oxide to form copper chromate.

There can also be employed a copper-chromium-silver compound impregnated support. Any convenient cupric copper, chromium or silver compound can be employed e.g. cupric oxide, cupric carbonate, cupric hydroxide, etc. as well as any convenient source of hexavalent chromium, e.g. chromium trioxide. The silver is conventionally employed as silver nitrate. If all of the chromium is not in the hexavalent state it is gradually made hexavalent during regeneration of the impregnated material.

The ratio of copper to chromium is not critical. Thus there can be 0.1 to 10 moles of copper compound per mole of chromium compound although usually there is employed 0.5 to 1.5 moles of copper compound per mole of chromium compound.

When the silver compound is employed it is used in amounts less than that of the chromium compound, e.g. from 0.01 to 0.5 mole per mole of chromium compound.

The copper-chromium or copper-chromium-silver compound is impregnated on the support to give 0.05 to 2 grams of impregnant per gram of support.

The preferred support is activated carbon either in granular, pulverized, fiber or cloth form because it has the highest surface area. However, other supports of high surface area can be used such as Alundum, fire brick, diatomaceous material, activated alumina or the like.

The support, preferably activated carbon, desirably has a surface area per gram of at least 600 sq. meters/gm. and can have a surface area of up to 1300 sq. meters/gm. Activated carbon supports employed usually have a surface area of 950 to 1200 sq. meters/gm. The support is usually granular in form of 4 to 325 mesh (U.S. sieve series).

As the activated carbon support which is impregnated there can be employed conventional activated carbons such as Pittsburgh type SGL or Pittsburgh type BPL, etc.

The present invention is useful to remove carbon monoxide from gases such as nitrogen, ammonia synthesis gas, flue gases, automobile exhausts, home heater exhausts, hydrogen, etc.

The carbon monoxide can be removed from the gases at room temperature but more efficient results are attained at elevated temperatures, preferably at 50° C. and more desirably 60° C. or 100° C. or higher, e.g. 125° C. At room temperature usually only 50% of the carbon monoxide is removed but at higher temperatures, e.g. above 75° C., 100% of the carbon monoxide is removed.

The carbon monoxide is not adsorbed on the support but instead is converted to carbon dioxide. If the carbon dioxide formed is not wanted in the final gas it can be removed therefrom in known manner. Thus it can be removed by passing the carbon dioxide containing gas through activated carbon impregnating with from 5 to 50% of monoethanolamine, e.g. 27.5% (based on the total weight of monoethanolamine and carbon) as more fully disclosed in Manes application Ser. No. 595,346, filed Nov. 18, 1966. The entire disclosure of the Manes application is hereby incorporated by reference. It should be noted that monoethanolamine impregnated activated carbon is ineffective for removing carbon monoxide from gases.

As previously indicated the preferred support for the copper-chromium (or copper-chromium-silver) is granular activated carbon. The impregnated activated carbon can be regenerated by passing air or other oxygen containing gas, e.g. pure oxygen or nitrogen containing 5 to 95% oxygen, through the exhausted carbon at elevated temperature. Preferably regeneration is carried out at 170–190° C. Lower temperatures, e.g. 100° C. take longer periods of time and higher temperatures create an ignition problem although temperatures up to 200° C. can be used.

It has also been found that the copper-chromium (or copper-chromium-silver) impregnated supports can be employed to remove nitric oxide (NO) from gases. In this case the preferred supports are non-oxidizable supports, e.g. activated alumina or silica since activated carbon is oxidized. If an activated carbon support is water washed (e.g. counter-currently) for regeneration purposes nitric acid is formed. The dilute nitric acid can be fed back into an appropriate tray in a nitric acid plant.

In the following examples as illustrated by the drawings there was employed copper-chrome or copper-chrome-silver carbon.

The copper-chrome-silver carbon was formed by impregnated granular Pittsburgh type BPL carbon (12 x 30 mesh) with a mixture of 114 grams of $CuCO_3 Cu(OH)_2$; 34 grams of $CrO_3$ and 3 grams of $AgNO_3$ in 284 cc. of aqueous ammonia (25 volume percent) and 390 cc. of water. The impregnated carbon was dried to give the copper-chrome-silver carbon containing 0.24 gram of impregnant per each gram of activated carbon.

The copper-chrome carbon was formed by impregnating granular Pittsburgh type BPL carbon (12 x 30 mesh) with a mixture of 114 grams of $CuCO_3 Cu(OH)_2$ and 34 grams of $CrO_3$ in 284 grams of aqueous ammonia (25 volume percent) and 390 grams of water. The impregnated carbon was dried to give the copper-chrome carbon containing 0.24 gram of impregnant for each gram of activated carbon (unless otherwise indicated).

The invention will be understood best in connection with the drawings wherein:

FIG. 3 is a graph showing CO breakthrough on copper-chrome-silver carbon and illustrating temperature effects;

FIG. 4 is a graph showing CO breakthrough on copper-chrome-silver carbon in a large bed;

FIG. 5 is a graph showing CO breakthrough on BPL carbon and monoethanolamine impregnated carbon;

FIG. 6 is a graph showing CO breakthrough on chromium impregnated carbon and copper impregnated carbon;

FIG. 8 is a graph showing CO breakthrough on virgin copper-chrome carbon and on regenerated copper-chrome carbon;

FIG. 9 is a graph showing NO breakthrough on copper-chrome carbon; and

Figure 1:
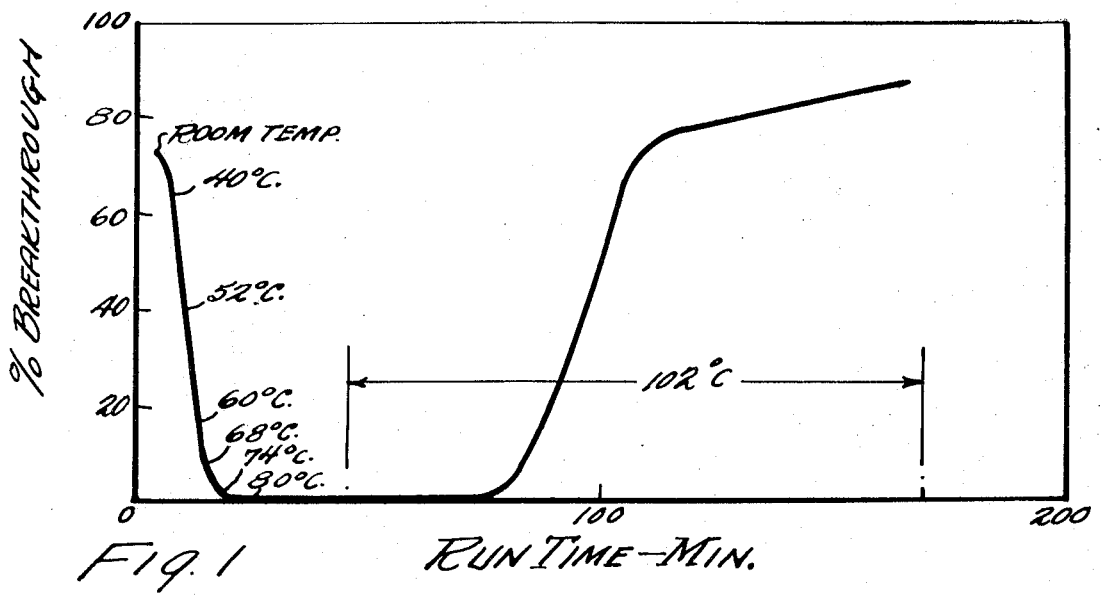
FIG. 1 is a graph showing the breakthrough of carbon monoxide on copper-chrome-silver carbon.

Referring to FIG. 1 of the drawings, the gas sample was nitrogen containing 3.97% CO. The flow rate of gas was 100 ml./min. and the copper-chrome-silver carbon bed was 20 mm. in diameter and 100 mm. deep. The run was begun at room temperature and the temperature of the bed was increased to 102 °C. which latter temperature was maintained until the end of the run. In FIG. 1 the time of the run in minutes is plotted as the ordinate against the carbon monoxide breakthrough as the abscissa. As can be seen from the graph after 5 minutes at room temperature there was a 74% CO breakthrough. At the end of 9 minutes (total time) the temperature was raised to 40° C. and the CO breakthrough had dropped to 65%. At the end of 11 minutes (total time) the temperature of the bed was increased to 52° C. and the CO breakthrough had dropped to 40%. At the end of 13 minutes (total time) the temperature of the bed was increased to 60° C. and the CO breakthrough had dropped to 17%. At the end of 15 minutes (total time) the temperature of the bed was increased to 68° C. and the CO break through had dropped to 7%. At the end of 18 minutes (total time) the temperature of the bed was increased to 74° C. and the CO breakthrough had dropped to 2%. At the end of 22 minutes (total time) the temperature of the bed was increased to 80° C. and the CO breakthrough had dropped to 0%. At the end of 46 minutes (total time) the temperature was increased to 102° C. where it was maintained until the end of the run (total time for the run was 170 minutes). There was no breakthrough at 102° C. for 30 minutes (in all there was no CO breakthrough for 54 minutes) and then there was a gradual increase in breakthrough until a 47% CO breakthrough after 99 minutes of the run (53 minutes of which was at 102° C.) and an 87% CO breakthrough at the end of the run. This run illustrates the importance of temperature in the removal of CO by the copper-chrome-silver carbon.

Figure 2:
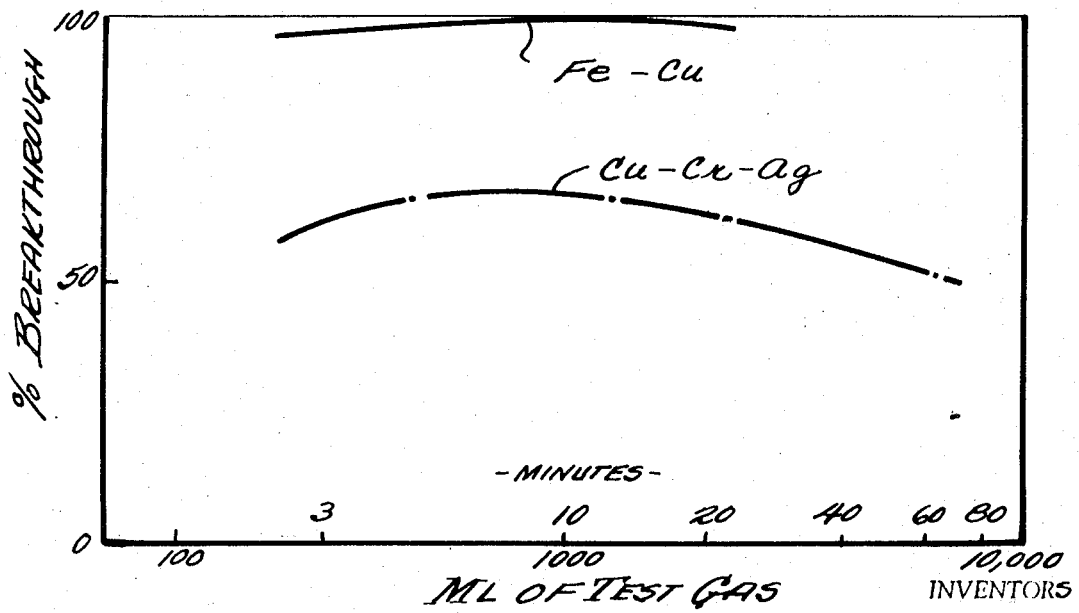
FIG. 2 is a graph showing CO breakthrough on copper-chrome-silver and copper-iron carbon.

Referring to FIG. 2 of the drawings, the gas sample was nitrogen containing 0.39% of CO. The flow rate of gas was 100 ml./min. and the carbon beds were 22 mm. in diameter and 100 mm. deep. The runs were carried out at room temperature. In FIG. 2 the total ml. of test gas and the time in minutes is plotted as ordinate (log scale) against the CO breakthrough as abscissa (regular scale). Using the copper-iron carbon there was virtually no removal of CO. Thus there was 96% CO breakthrough after 2.4 minutes (240 ml. of test gas) and virtually 100% breakthrough in 7 minutes (700 ml.) of test gas. In contrast using the copper-silver-chrome carbon there was only a 58% breakthrough after 2.4 minutes (240 ml. of test gas) and a maximum breakthrough of 66% after 7.2 minutes (720 ml. of test gas) with the breakthrough gradually falling off thereafter so that the breakthrough was only 51% after 74 minutes (7400 ml. of test gas) at the termination of the run. This figure illustrates the fact that the choice of impregnant is important.

Referring to FIG. 3 of the drawings, the gas sample was nitrogen containing 0.39% CO. The flow rate of gas was 100 ml./min. and the copper-silver-chrome carbon bed was 20 mm. in diameter and 100 mm. deep. In FIG. 3 the time of the run in minutes is plotted as the ordinate against the percent breakthrough as the abscissa. The run was carried out at a bed temperature of 108° C. for 3.65 hours on a first day and then stopped. The run then started up again the next day and run at room temperature for another 5.7 hours (9.35 total run time) and then the bed temperature was gradually increased to 100° C. over the next 0.65 hour and maintained at 100° C. until the end of the run, total run time 11 hours. It will be observed that there was no CO breakthrough in the 3.35 hours at 108° C. and also no breakthrough in the next 3.15 hours at room temperature (6.5 hours total run time). At the end of 3.65 hours at room temperature (7 hours total run time) the CO breakthrough was 0.2%. At the end of 4.65 hours at room temperature (8 hours total run time) the CO breakthrough was 2%. At the end of 5.60 hours at room temperature (8.9 hours total time) the CO breakthrough was 6.8%. At the end of 5.7 hours at room temperature (9.35 hours total time) the CO breakthrough was 12.2%. At this point the carbon bed was heated and after a further 0.15 hour (9.5 hours total time) the CO breakthrough had dropped to 4.4%. The heating was continued for another 0.20 hour to 80° C. (9.7 hours total time) at which time the CO breakthrough had dropped to 0%. The temperature was increased to 100° C., after another 0.3 hour (10 hours total time) and was maintained there for another hour (11 hours total time) without any CO breakthrough. In this run it was also observed that the CO breakthrough had dropped to 0.5% by the time the temperature of the bed and had increased to 60° C. (on its way to a 100° C. bed temperature). Apparently the impregnant is in a more effective form at elevated temperatures, particularly at 50° C. and above than it is at room temperature and carrying out of CO removal at room temperature gradually converts the most effective form of impregnant to a less effective form. It will be observed that using at room temperature the impregnated catalyst which had previously been employed at 108° C. did not immediately reduce the efficiency which is indicative of the fact that the chemical nature of the impregnant is altered as it removes the carbon monoxide.

Referring to FIG. 4 of the drawings the gas sample was nitrogen containing 0.39% CO. The flow rate of gas was 100 ml./min. and the carbon bed was 20 mm. in diameter and 650 mm. deep. The run was carried out at room temperature. In FIG. 4 the total ml. of test gas is plotted as the ordinate (log scale) against the percent CO breakthrough as abscissa (regular scale). There was no breakthrough of CO for the first 1200 ml. of test gas. At 1500 ml. there was a 6% CO breakthrough. At 2000 ml. there was a 10% CO breakthrough. At 4400 ml. the CO breakthrough reached a maximum 14%. The breakthrough remained near this value until near the end of the run when it gradually fell to 10% CO breakthrough at 10,000 ml. of test gas.

Referring to FIG. 5 of the drawings the gas sample was nitrogen containing 0.39% CO. The flow rate of gas was 100 ml./min. and the carbon beds were 20 mm. in diameter and 100 mm. deep. The runs were carried out at room temperature. In FIG. 5 the total ml. of gas (and the time in minutes) is plotted as ordinate (log scale) against the percent CO breakthrough as abscissa (regular scale). Using virgin Pittsburgh BPL activated carbon it will be observed that there was virtually no removal of CO. There was 98% CO breakthrough after 2.2 minutes (220 ml. of test gas) and virtually 100% breakthrough in 6.6 minutes (660 ml. of test gas). The monoethanolamine (MEA) impregnated BPL carbon (0.46 gram of MEA per gram of carbon) was virtually no better. Thus there was 97% CO breakthrough after 2.6 minutes (260 ml. of test gas) which improved slightly to a minimum CO breakthrough of 96% after a total time of 9.6 minutes (960 ml. of test gas), the CO breakthrough eventually advancing to 98% after a total time of 23 minutes (2300 ml. of test gas) at termination of the run.

Referring to FIG. 6 of the drawings the gas samples for curves A and B was nitrogen containing 3.9% CO. The gas sample for curve C was air containing 3.3% CO. The flow rate of gas for all of the curves was 100 ml./min. and the carbon beds were 20 mm. in diameter and 100 mm. deep. The run for curve A was carried out at 102° C. and the runs for curves B and C at 100° C. In FIG. 6 the time in minutes is plotted as ordinate against the percent CO breakthrough as abscissa.

For curve A there was employed BPL carbon impregnated with 0.24 gram of $CrO_3$ per gram of carbon and for curves B and C there was employed BPL carbon impregnated with 0.24 gram of CuO per gram of carbon. As can be seen from curves A, B and C the copper and chromium compounds alone were virtually ineffective to remove the CO. Thus as shown by curve A using the chromium compound there was 95% CO breakthrough after 3 minutes. This breakthrough gradually increased to 99% breakthrough after 17.6 minutes and 100% CO breakthrough after 20.5 minutes. The copper compound with the same test gas as shown in curve B had 85% CO breakthrough after 5.5 minutes. This dropped to 79% CO breakthrough after a total of 7.9 minutes and remained at about 80–81% CO breakthrough for the balance of the run which was terminated after a total run of 20 minutes. As shown by curve C substantially the same results were obtained when the copper compound was employed with air containing CO. Thus as shown by curve C after 3.5 minutes the CO breakthrough was 80% and this increased to 86% after a total run time of 12.3 minutes. The run was terminated after a total time of 16 minutes at which point the CO breakthrough was 85%.

Figure 7:
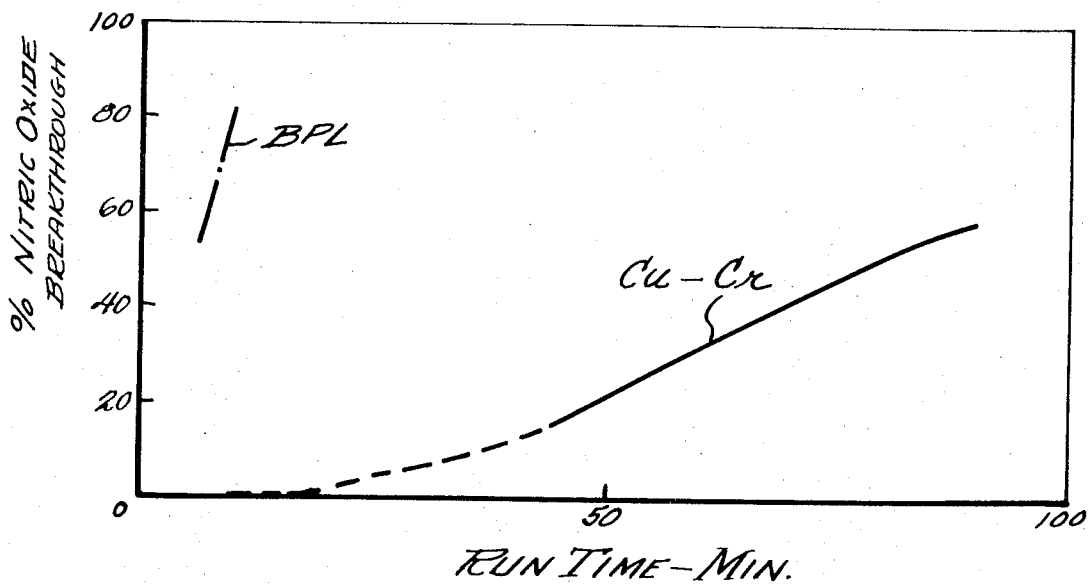
FIG. 7 is a graph showing NO breakthrough on copper-chrome carbon and on BPL carbon.

Referring to FIG. 7 of the drawings the gas sample for the copper-chrome carbon curve was nitrogen containing 5% NO and for the BPL carbon curve was nitrogen containing 2.5% NO. The flow rate of gas was 100 ml./min. for each curve, the carbon bed for the copper-chrome curve was 20 mm. in diameter and 100 mm. deep and the carbon bed for the BPL curve was 20 mm. in diameter and 140 mm. deep. The copper-chrome carbon run was carried out at 120° C. and the BPL run was carried out at room temperature. In FIG. 7 the time in minutes of the run is plotted as ordinate against the percent NO breakthrough as abscissa.

The BPL run showed a 71% NO breakthrough in 5 minutes.

The copper-chrome run showed 0% NO breakthrough after 19 minutes, 14% NO breakthrough after 45 minutes, 20% NO breakthrough after 50 minutes, 32% NO breakthrough after 60 minutes, 45% NO breakthrough after 75 minutes and 55% NO breakthrough after 90 minutes.

Referring to FIG. 8 of the drawings the gas sample was nitrogen containing 3.9% CO. The flow rate of gas was 100 ml./min. and the copper-chrome carbon beds were 20 mm. in diameter and 100 mm. deep. The runs were carried out at 100° C. Sample A contained 0.24 gram of the copper-chromium impregnant per each gram of activated carbon.

The regeneration runs were all with sample A.

In FIG. 8 the time in minutes is plotted as ordinate against the percent CO breakthrough as abscissa.

With sample A there was no CO breakthrough for 60 minutes, after 63 minutes there was 7% CO breakthrough, after 65 minutes there was 13% CO breakthrough, after 67 minutes there was 22% CO breakthrough, after 68.5 minutes there was 32% CO breakthrough, after 72.5 minutes there was 43% CO breakthrough, after 75 minutes there was 67% CO breakthrough, after 82 minutes there was 73% CO breakthrough and when the run was terminated after 85 minutes there was 75% CO breakthrough.

Sample A impregnated carbon bed was given a first regeneration by passing air at a rate of 200 ml./min. and a temperature of 102° C. through the carbon bed. The impregnated carbon after the first regeneration was then placed on stream again to remove CO from the nitrogen. There was no CO breakthrough for 10 minutes, after 12.5 minutes there was 4% CO breakthrough, after 15 minutes there was 15% CO breakthrough, after 17 minutes there was 28% CO breakthrough, after 24.5 minutes there was 48% CO breakthrough, after 30 minutes there was 59% CO breakthrough. This run illustrated the fact that the regeneration temperature was too low. Thus the exhausted impregnated carbon just employed was given a second regeneration at a bed temperature increasing from 102 to 188° C. over 30 minutes using an air flow of 200 ml./min. The impregnated carbon after the second regeneration was again placed on stream to remove CO from nitrogen. There was no CO breakthrough, after 66 minutes there was 18% CO breakthrough, after 70.5 minutes there was 63% CO breakthrough, after 73 minutes there was 71% CO breakthrough, after 85 minutes there was 85% CO breakthrough. The efficiency for CO removal after the second regeneration was substantially the same as that for the virgin impregnated carbon. The exhausted carbon was given a third regeneration using the same regeneration conditions as for the second regeneration. Accidentally about 10% of the bed was lost through spillage. The impregnated carbon after the third regeneration was again placed on stream to remove CO from nitrogen. There was no CO breakthrough for over 50 minutes, after 53 minutes there was 2% CO breakthrough, after 57 minutes there was 7% CO breakthrough, after 60.5 minutes there was 17% CO breakthrough, after 62.5 minutes there was 32% CO breakthrough, after 64 minutes there was 59% CO breakthrough, after 66.5 minutes there was 68% CO breakthrough and after 71 minutes there was 80% CO breakthrough. The apparent loss in efficiency after the third regeneration almost coincides with the amount of impregnated carbon loss through spillage. Hence there was no actual loss in efficiency between the second and third regenerations. The exhausted carbon was given a fourth regeneration using the same regeneration conditions as for the second regeneration. The impregnated carbon after the fourth regeneration was again placed on stream to remove CO from nitrogen. There was no CO breakthrough for 20 minutes at which point the run was stopped to analyze the product.

Referring to FIG. 9 of the drawings the gas sample was nitrogen containing 5.0% NO. The flow rate of the gas was 100 ml./min. and the copper-chrome carbon beds were 20 mm. in diameter and 100 mm. deep. The runs were carried out at 115° C. In FIG. 9 the time in minutes is plotted as ordinate against the percent NO breakthrough as abscissa.

The impregnated carbon showed no NO breakthrough for 35 minutes, after 44 minutes there was 11% NO breakthrough, after 50 minutes there was 25% NO breakthrough, after 56 minutes there was 29% NO breakthrough, after 63 minutes there was 31% NO breakthrough, after 105 minutes there was 32% NO breakthrough, after 125 minutes there was 36% NO breakthrough, after 140 minutes there was 39% NO breakthrough and after 150 minutes there was 51% NO breakthrough.

The impregnated carbon was regenerated at 192° C. using air as a regenerant at 185 cc./min. for 105 minutes. The impregnated carbon was then placed on stream again to remove NO from the nitrogen but as can be seen from FIG. 10 was almost completely ineffective since there was 33% NO breakthrough after 7 minutes, 73% NO breakthrough after 15 minutes and 92% NO breakthrough after 20 minutes.

Figure 10:
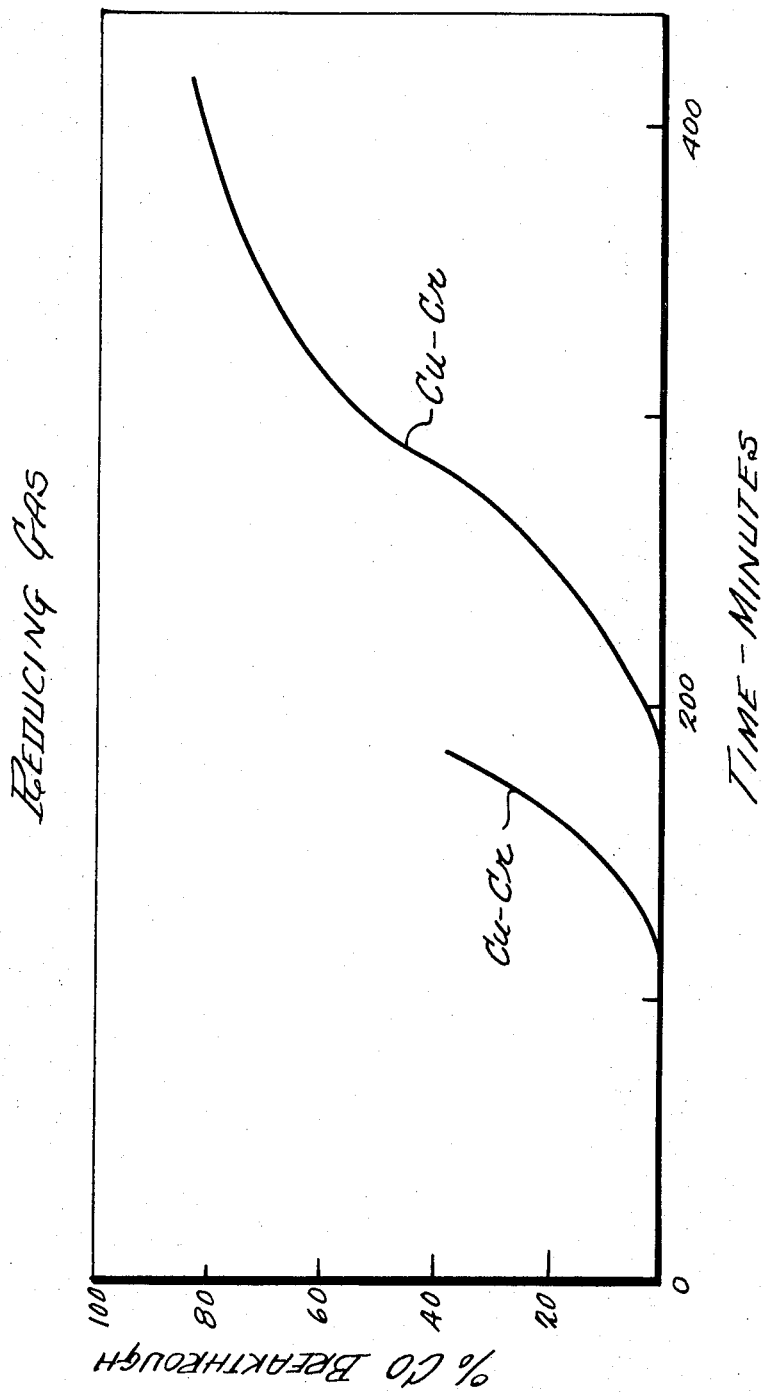
FIG. 10 is a graph showing CO breakthrough on copper-chrome carbon with a reducing gas.

The invention is particularly useful in removing carbon monoxide from a reducing gas containing the same. An example of such a reducing gas is ammonia synthesis gas. It is surprising that the copper-chromium material works successfully in a reducing atmosphere since the chromium is in the hexavalent state. FIG. 10 of the drawings illustrates the results obtained using a reducing gas.

Referring to FIG. 10 the gas sample having nominally the analysis of 74% hydrogen, 24% nitrogen, 0.5% methane, 0.05% carbon dioxide, 0.38% carbon monoxide. The balance was inert gases such as argon. The flow rate of gas was 100 ml./min. in the absorption cycles. The copper-chrome carbon beds were 20 mm. in diameter and 100 mm. deep. The adsorptions were carried out at 108° C. Regeneration was carried out by treating the copper-chrome-carbon from the virgin run with air at 200 ml./min. at 203° C. for 110 min. to regenerate the carbon.

In FIG. 10 the time in minutes is plotted as ordinate against the percent CO breakthrough as abscissa. With the virgin run there was no CO breakthrough for 190 minutes, and after 280 minutes there was a 40% CO breakthrough.

The carbon was regenerated in the manner specified above. The regenerated copper-chrome-carbon was then used to adsorb CO from the same reducing gas mixture as employed with the virgin carbon. There was no CO breakthrough for 125 minutes, a 5% CO breakthrough after 135 minutes and 38% breakthrough after 185 minutes.

What is claimed is:

1. A process for removing CO from a mixture with another gas comprising passing the gas mixture at a temperature of not over 125° C. through a high surface area activated carbon support impregnated with copper-chromate, the chromium being in the hexavalent state and regenerating the exhausted impregnated activated carbon with an oxygen containing gas at a temperature of 100 to 200° C. and is again employed to remove CO from the gas mixture.

2. A process according to claim 1 wherein the regeneration temperature is at least 102° C.

3. A process according to claim 1 wherein the CO is removed at a support temperature of 50 to 125° C.

4. A process according to claim 1 wherein the gas mixture is a reducing gas consisting of ammonia synthesis gas.

5. A process according to claim 1 wherein the gas mixture consists of a member of the group consisting of (1) nitrogen and carbon monoxide, (2) ammonia synthesis gas, and (3) hydrogen and carbon monoxide.

6. A process according to claim 1 wherein the CO is removed at a support temperature of at least 50° C.

7. A process according to claim 6 wherein the CO is removed at a support temperature of at least 60° C.

8. A process according to claim 1 wherein the regeneration is carried out at 170–190° C.

9. A process according to claim 1 wherein the oxygen containing gas is air.

10. A process according to claim 9 wherein the regeneration is carried out at 170–190° C.

11. A process according to claim 1 wherein the material impregnated on the support consists essentially of copper chromate.

12. A process according to claim 1 wherein the gas mixture is passed through an impregnated support consisting essentially of copper-chrome-silver compound.

13. A process according to claim 1 wherein the gas mixture is a reducing gas.

References Cited
UNITED STATES PATENTS

| | | | |
|---|---|---|---|
| 1,842,010 | 1/1932 | Braus | 23—2 |
| 2,942,933 | 6/1960 | Batchelder et al. | 23—2 |
| 3,236,783 | 2/1966 | Stiles | 23—2X |
| 3,257,163 | 6/1966 | Stiles | 23—2 |
| 2,031,475 | 2/1936 | Frazer | 23—2 |
| 2,092,059 | 9/1937 | Frazer | 23—2 |
| 3,230,034 | 1/1966 | Stiles | 23—2 |

EARL C. THOMAS, Primary Examiner

U.S. Cl. X.R.

23—159